(12) United States Patent
Heys (10) Patent No.: US 9,630,534 B2
(45) Date of Patent: Apr. 25, 2017

(54) LATERAL BACK SUPPORT

(71) Applicant: Ted Clifton Heys, Newbury Park, CA (US)

(72) Inventor: Ted Clifton Heys, Newbury Park, CA (US)

( * ) Notice: Subject to any disclaimer, the term of this patent is extended or adjusted under 35 U.S.C. 154(b) by 278 days.

(21) Appl. No.: 14/505,708

(22) Filed: Oct. 3, 2014

(65) Prior Publication Data

US 2015/0097400 A1    Apr. 9, 2015

Related U.S. Application Data

(60) Provisional application No. 61/961,005, filed on Oct. 3, 2013.

(51) Int. Cl.
*B60N 2/44* (2006.01)

(52) U.S. Cl.
CPC .......... *B60N 2/449* (2013.01); *B60N 2/4492* (2015.04)

(58) Field of Classification Search
CPC .............................. B60N 2/449; B60N 2/4492
USPC ..... 297/230.14, 230.13, 183.1, 284.8, 230.1, 297/230.11, 230.12; 5/633, 653, 630, 655
See application file for complete search history.

(56) References Cited

U.S. PATENT DOCUMENTS

| | | |
|---|---|---|
| 1,673,433 A | 6/1928 | Wheeler et al. |
| 2,081,111 A | 5/1937 | Manley |
| 2,822,033 A | 2/1958 | Dixon |
| 2,822,034 A | 2/1958 | Dixon |
| 3,542,421 A | 11/1970 | Ambrose |
| 3,811,140 A * | 5/1974 | Burpo .................... A61G 7/065 5/604 |
| 5,769,498 A | 6/1998 | Smith |
| 6,019,428 A | 2/2000 | Coffield |
| 6,560,800 B1 * | 5/2003 | Draves ................ A47C 20/027 5/630 |
| 6,695,410 B2 * | 2/2004 | Hsia ...................... A47C 7/021 297/284.3 |
| 6,938,925 B2 | 9/2005 | Mather |
| 6,951,367 B1 | 10/2005 | Dinnan |
| 7,237,848 B1 | 7/2007 | Story |
| 7,240,384 B2 * | 7/2007 | DuDonis ............. A47C 20/027 5/633 |
| 7,651,163 B2 * | 1/2010 | Jaskot ................... A47C 7/425 297/230.1 |

FOREIGN PATENT DOCUMENTS

FR    WO02083453    10/2002

OTHER PUBLICATIONS

Angel Pad, www.angelwingstech.com.
G-Force Racing Gear Torso Harness, www.gforce.com/products/netsanres/4290.php.

* cited by examiner

*Primary Examiner* — Syed A Islam
(74) *Attorney, Agent, or Firm* — Lowry Blixseth LLP; Scott M. Lowry (57) ABSTRACT

The lateral back support includes a pair of wedge-shaped pads adjustably connected to one another for positioning on a vehicle seat to support a torso of a user when subjected to lateral forces. The pair of pads act as a shim sandwiched between the torso and a side bolster of a seat, thereby preventing the torso from leaning sideways while cornering.

18 Claims, 8 Drawing Sheets

LATERAL BACK SUPPORT

BACKGROUND OF THE INVENTION

This invention relates to a lateral back support for use with a seat in order support the back. More specifically, it relates to vertically orientated side pads that help resist lateral forces encountered while cornering.

While driving through a curve in a car, the lateral forces act on the body and push it sideways. The hips stay relatively motionless because the occupant's weight pushing down creates sufficient friction between the seat bottom and the occupant, thereby resisting the sliding movement. However, the torso is leaning against the seat back at an angle, which only transmits a small fraction of the weight to the seat back so its ability to resist the lateral forces is limited. Therefore, during cornering, the torso is pushed sideways and the occupant will consequentially exert physical effort to resist these forces.

In order to provide lateral support for the torso during cornering, most modern automobiles are equipped with bucket seats that include side bolsters. The side bolsters are extensions of the seat back that project forward on both sides of the seat and make contact with the torso, normally from the ribcage on down. The face of the side bolster is typically at a 45 degree angle to the lateral direction of force, slightly more on sports cars and less on trucks and vans. This angle is suitable for everyday usage as it allows easy entry and exiting the seat. It also accommodates a wide variety of users of greatly varying torso widths.

On racing seats, the angle of the side bolster surface that is in contact with the torso is nearly perpendicular to the lateral direction of force. This angle effectively supports the torso while cornering as the driver has a flat surface to lean against. Because the torso is immobilized, the side bolsters feel as if they are pushing back against the torso. This force is felt as feedback from the car. This feedback is critical as it conveys the amount of lateral force acting on the vehicle. The driver uses this feedback information and other factors to determine the velocity through the corner.

The side bolsters on a bucket seat are disposed at an obtuse angle with respect to the seat back thereof, not perpendicular, thereby providing torso immobilization. During cornering, the torso can slip along the side bolster face. This sideways pivoting of the torso can be very distracting as the driver must exert attention and energy to resist this force. While on roads with many corners, this reoccurring struggle can cause fatigue, which can lead to an error in judgment, possibly causing an accident.

Drivers have developed many techniques to overcome the lack of lateral support in a bucket seat. Intuitively, the upper body leans in the direction of the corner while pressing the torso into the opposite side bolster. The legs are pressed outward against the interior of the car. A common instinctual reaction is to grab hard on the steering wheel. This reduces the ability to feel the subtle feedback forces from the steering wheel as it is clenched tight. Amateur racers will press the torso hard against the seat back to create more friction between the two surfaces. This technique requires much strength and diverts energy and attention away from driving.

Another technique engages the seat belt tensioner while the seat is at a rearward position and then is slid forward which makes the belt feel tighter. Four and five point racing harness seat belts can be used to reduce sideways movement in a bucket seat. The shoulder belts press the torso hard into the back of the seat. The contact forces are felt primarily on the front and rear of the torso, not the sides, so the perception of lateral forces is not as clearly as felt in a racing seat.

Even with all of the aforementioned techniques and equipment, the quantity and quality of feedback from a bucket seat is much less than compared to a racing seat with perpendicular side bolsters. For most driving enthusiasts, changing out the stock bucket seat for a racing seat is an expensive and complicated option. Most car owners do not want a racing seat for everyday driving, as it is not as comfortable as the stock seat.

Furthermore, racing seats are difficult to get into, as the user must enter and exit straight forward. In addition, the interior width needs to be tailored for the specific user to ensure a snug fit.

Bench seats were standard for most of the 20th Century. Bucket seats were initially developed for automobile racing and were gradually introduced to mass-market cars in the 1970s. The leg and side bolsters on a bucket seat provide surfaces for the driver to lean against and stop the sideways sliding of the body while cornering.

The prior art discloses several examples of side bolster enhancements intended for bench seats. For example, U.S. Pat. No. 1,673,433, entitled Auxiliary Seat Back, discloses a seat accessory designed to constrain the driver's lateral body movement. The standard bench seat provides negligible side support. This device provides some lateral support as the padding thickness increases away from the vertical centerline. The pads are fixed to the seat by a pair of straps extending up and over the top of the seat back, thereby attaching the device to the seat and controlling its vertical position thereof. But, this particular mounting orientation is undesirable as it prevents the user from adjusting the vertical position of the device.

U.S. Pat. No. 2,081,111, entitled Automobile Cushion, discloses a device that acts as a stabilizer keeping the driver rigidly in place while going around curves. The support structure is composed of a backing sheet with two vertical pads, which is placed on a bench seat. It is held in position by the force of the driver leaning against the back of the seat. The section view shows the profile of the pads, which are inadequate to resist strong lateral forces, as they would tend to deflect sideways. Also, the shape of the pads undesirably fails to follow the contour of the back and is in need of more refinement.

Additionally, U.S. Pat. No. 2,822,033, entitled Lateral Support for Humans on Flat Vehicle Seats, and U.S. Pat. No. 2,822,034, entitled Collapsible Lateral Back Support, disclose pads that attach to the bench seat by a wide strap that wraps around the seat. The pads themselves are removable and can be attached in various positions along the strap. The face of the pad is at a 45 degree angle so in effect, this invention converts a bench seat backrest into the upper portion of a bucket seat by adding side bolsters. The side bolstering provided by this device, however, is far from the optimum perpendicular angle necessary to resist the lateral forces.

U.S. Pat. No. 3,542,421, entitled Back Supports, discloses a device having two vertical pads mounted to a centrally located material sheet structure that controls the horizontal spacing and the vertical position. The pads are attached to the backing with Velcro®-style hook and loop tape so that they can be adjusted to many different positions. The device is held in position by extending the upper portion of the central material, which has a semi-rigid member, up and over the seat back, thereby hooking it onto seat. As with U.S.

Pat. No. 2,822,033, the face of the pad that is in contact with the driver is angled so its ability to resist the lateral forces is limited.

Additionally, U.S. Pat. No. 5,769,498, entitled Detachable Vehicle Seat Bolster, discloses a detachable device having a wishbone configuration that mounts to a vehicle seat. The structure has rigid sides that project forward of the side bolsters on the existing seat and provide surfaces that the driver may lean against during cornering. The side members are thin, however, and are insufficiently rigid enough to resist strong cornering forces. Furthermore, the amount of padding seems minimal, if any. Another drawback is that the device must be attached to the seat with hardware, thereby limiting the degree of adjustability.

U.S. Pat. No. 6,019,428, entitled Seat Bolster Adjustment Assembly, discloses a device where the side support members are all composed in one unit that mounts in back of the seat. This device, however, is highly complex and difficult to use.

In another prior art reference, U.S. Pat. No. 6,951,367, entitled Vehicle Seat Pad, discloses a device having a cloth material that covers a bucket seat and additional side bolster pads attached thereto with Velcro®-style hook and loop tape so that they can be adjusted to many different positions. The Velcro® fasteners are not designed to withstand the lateral forces associated with cornering would likely peel-off under lateral loading.

U.S. Pat. No. 7,237,848, entitled Back and Internal Organ Supportive Belt, discloses a device for use by heavy equipment operators. The contact surfaces of the pads are at an angle which provides support to internal organs and the musculoskeletal system. This device reduces the normal downward direction of force, not as a support against lateral forces encounter while cornering.

WO 2002083453, entitled Comfort Accessory for Vehicle Seat discloses vertically oriented pads attached to a central member that hooks onto the top of the seat. In addition, an air-filled bladder supports the lumbar region. Moreover, the pad mounting is accomplished with Velcro®. The pads are composed of a high-density foam inner core, with an outside layer of lower-density foam for comfort. The shape of the pads, however, does not provide sufficient support under lateral loading.

In general, conventional back support devices typically include a vertical semi-rigid member acting as the anchor point of the pads. While cornering, the lateral forces push the torso against the pads. If the pads are attached adequately, then the forces are transferred to the vertical semi-rigid member. The vertical semi-rigid member is not mounted to the seat in a manner sufficient to withstand strong lateral forces. Thus, the vertical semi-rigid member is prone to slipping out of position. Of the prior art references mentioned herein, none are available in the auto accessories aftermarket. In fact, many are simple concepts on paper that do not appear to have been thoroughly tested with any many evolving prototypes. The more elaborate designs are overly complicated with many parts, making them expensive and evidently, commercially nonviable.

There are prior art references that disclose mechanical and pneumatic devices for increasing the side bolstering, but these devices are built into the seat. While seated, the angle of the side bolster face can be adjusted depending on the driving conditions by activating a switch. A typical situation occurs when more side support is needed navigating a mountain road with many sharp corners. This adjustability feature is included in many contemporary luxury and sports cars. Some high-end models have sensors that monitor the cornering forces and automatically adjust the side bolsters to support the driver. These devices, however, are complex and expensive.

The most common solution to increasing the lateral support of non-adjusting side bolsters in a stock bucket seat is replacing it with a racing seat. This is an expensive option and uncomfortable for everyday driving.

A racing seat belt system can be added to a bucket seat which holds the driver in place by pressing the torso hard into the back of the seat. However, the torso can still slide side to side as the belts press backwards and rely on increasing the friction between the back and the seat to reduce the pivoting, not contact with the side bolsters. The G-Force Racing Gear torso harness is a simple latitudinal strap that wraps around the back of the seat and front of the chest and presses in on the torso. This prevents the torso from forward movement but is not effective is resisting lateral forces.

A popular product in the sports car community is the CG-Lock, the structure and operation being substantially disclosed in U.S. Pat. No. 6,938,925, entitled Apparatus for Use on a Safety Belt System for Restraining the Movement of an Occupant or Child Seat. The CG-Lock made by Lap Belt Cinch, Inc. of 120 Cornwall Road, Harrogate Landenberg, Pa. 19350, makes the lap portion of a standard seat belt tight and unyielding. This is very effective in preventing the hips and lower body from sliding during cornering. However, it does not affect the upper body, which is still free to lean side to side.

Another product called the Angel Pad limits the movement of the lower body during cornering. This device is comprised of a pair of foam blocks joined together by a fabric bridging element. The foam blocks are positioned on the outside of the hips and held in place by the force of the hips pressing the blocks against the car structure. Like the CG-Lock, this offers no support for the upper body.

Lateral supports for other types of seats are available especially in the category of wheelchairs, where the user may not have the ability to resist lateral forces.

There exists, therefore, a significant need for a lateral back support that includes a pair of adjustable pads removably mountable to a seat and disposed generally perpendicular to seat back. The present invention fulfills these needs and provides further related advantages.

SUMMARY OF THE INVENTION

The present embodiment is comprised of a pair of wedge shaped pads that are sandwiched in-between the torso and the side bolsters of a vehicle seat. Two adjustable laces connect the two pads together and thus control the separation distance and angle. The laces are anchored on the right side pad and pass through the left side pad, exiting towards the front of the pad where the distance is fixed by employing a cord locking device. The lace length determines the distance between the two pads and thus the quantity and location of the compressive force exerted by the pads directed inwards toward the torso. Each pad includes a forward protruding handle that is easily accessible and allows quick and decisive adjustment of the pad position while seated. The embodiment is held on to the seat by the weight of the torso pressing against the pads and laces. On the surfaces of the pads that are in contact with the seat's side bolsters, a friction layer is included which effectively prevents the pads from slipping under lateral loading.

The lateral back support disclosed herein generally includes a right and a left pad connected by a pair of independently adjustable connecting members, such as flexible laces or the like. The laces couple the right pad to left pad and are generally spaced apart from one another along the height of the pads. A stopper, such as a push-button cord lock, couples to each of the laces to define the maximum length of the respective laces between the right and left pads. The stoppers are independently adjustable, thereby permitting the laces to have different adjusted lengths between the right and left pads, which allows the pads to be set at various angular orientations relative to one another. The pads preferably have a complementary wedge-shape and may include a forwardly facing cushioning layer, a friction layer along a back surface thereof and a handle extending outwardly diagonally downwardly and away from the other handle. In one embodiment, the right pad includes a pair of cavities having a size and shape for receiving one end of the laces and a respective anchoring member that anchors the laces to the right pad. The left pad may include a pair of passageways extending therethrough and having a size and a shape for slidably receiving the laces. The stoppers may couple to the respective laces on one side of the respective passageway such that the relative positioning of the stopper along the length of the connecting member sets the maximum length one pad may be spaced apart from the other pad along that particular lace or connecting member.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the drawings for the purposes of illustration, the present disclosure for a lateral back support is referred to generally by the reference numeral 10 in FIGS. 1-7. In one embodiment, the lateral back support 10 as disclosed herein generally includes a right pad 12a and a left pad 12b joined by an upper lace 14a generally spaced apart from a lower lace 14b. In the embodiment illustrated in FIGS. 1 and 2, the left and right pads 12a, 12b are complementary (i.e., the right pad 12a is right-handed and the left pad 12b is left-handed) and have a wedge-shape. The upper and lower laces 14a, 14b permit the pads 12a, 12b to move toward and away from one another. In the embodiment illustrated in FIGS. 1-3, the laces 14a, 14b are generally the same length. Although, the lace 14a may be longer or shorter than the lace 14b to facilitate adjusting the angular orientation between the pads 12a, 12b as will be discussed in greater detail below. The laces 14a, 14b are preferably constructed from a flexible material (e.g., woven polyester), but may be rigid (e.g., a shaft or a rod) as well. The pads 12a, 12b are composed of a firm, but cushioning material, such as expanded rubber. The FWD arrow 16 indicates the forward direction of the lateral back support 10. The pair of pads 12a, 12b may have any suitable shape (e.g., cylindrical). The lower front end on the pads 12a, 12b include a diagonally protruding handle 18. The rear surfaces of the pads 12a, 12b, which contact a pair of side bolsters 20 disposed on a vehicle seat 22, are covered with a friction layer 24 that grips the seat 22 when lateral force is applied thereto. The inner surfaces of the pads 12a, 12b, which contact a torso 26 of a user 28 (FIG. 4), include a cushioning layer 30.

Figure 1:
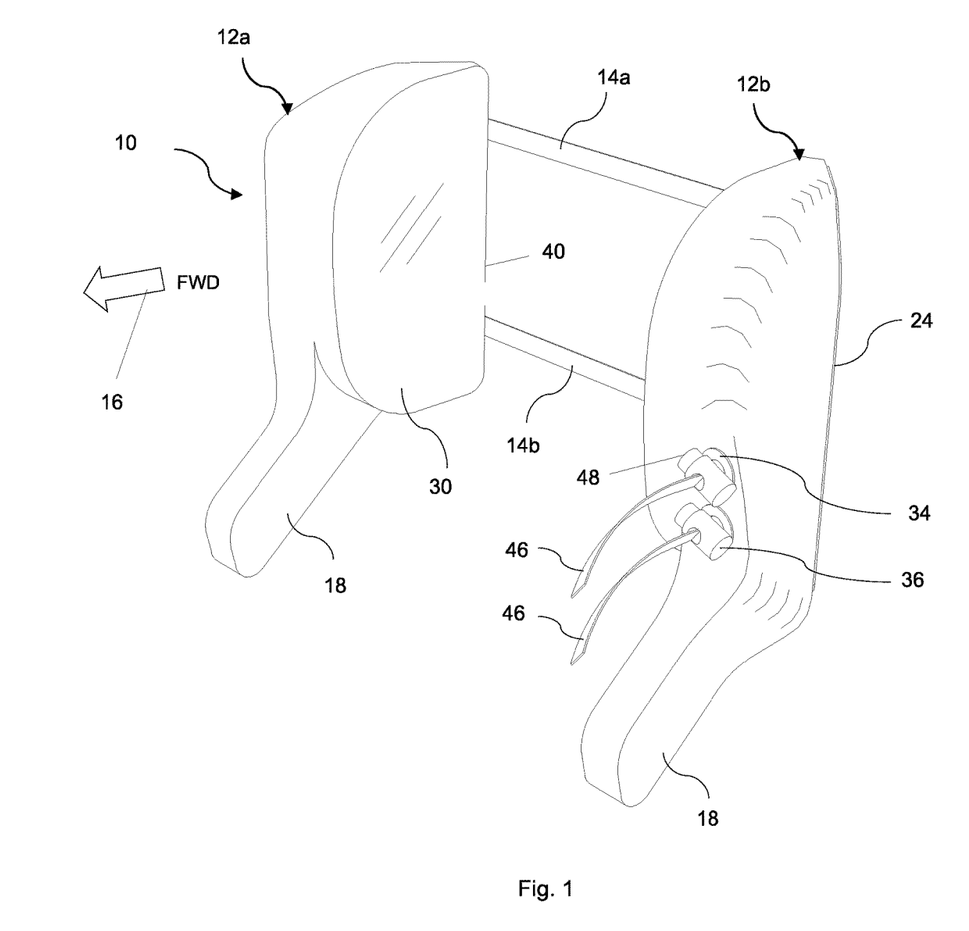
FIG. 1 is a perspective view of one embodiment of a lateral back support disclosed herein.
Figure 2:
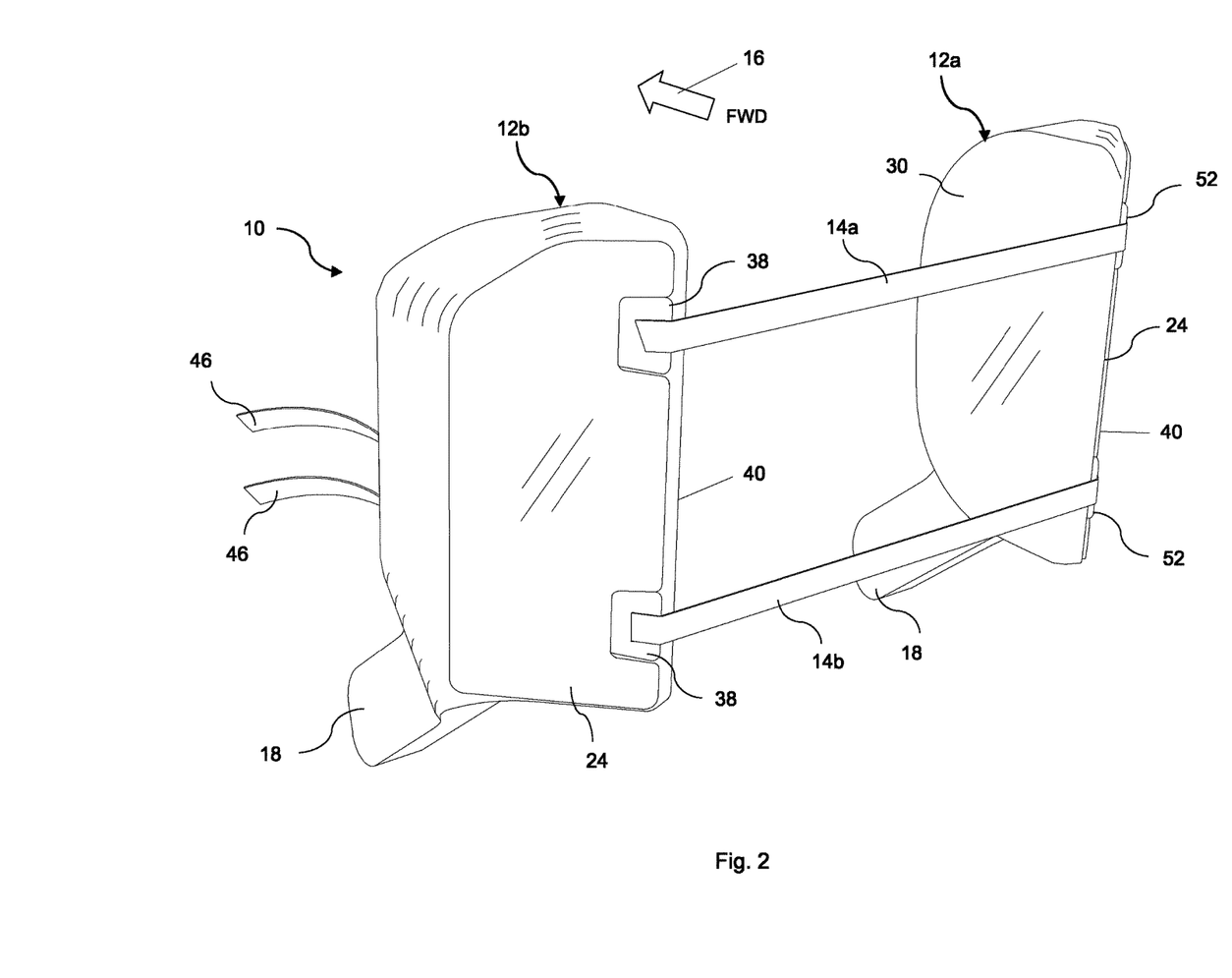
FIG. 2 is an alternate perspective view of the lateral back support similar to FIG. 1, illustrating the rear thereof.
Figure 3:
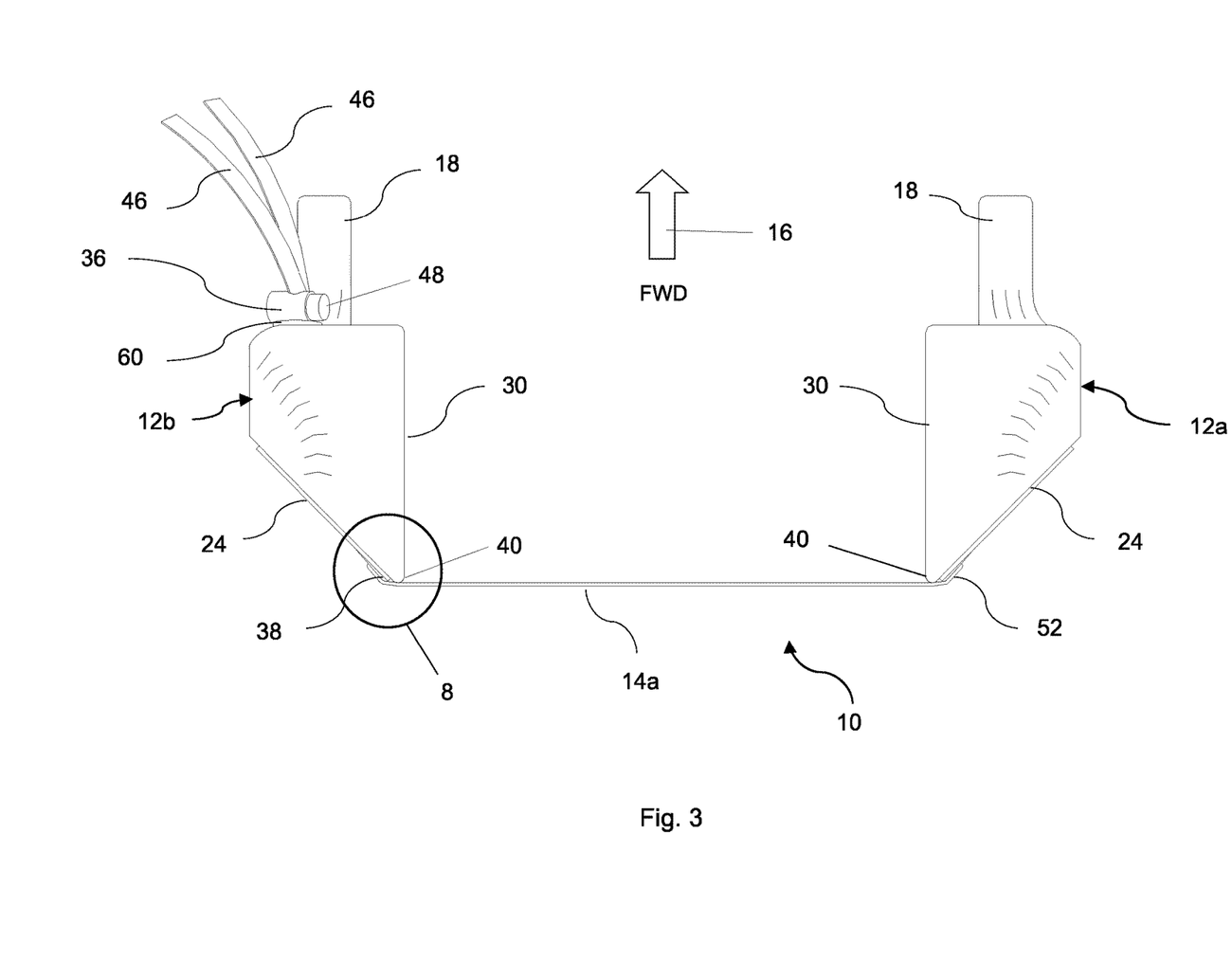
FIG. 3 is a top plan view of the lateral back support similar to FIGS. 1 and 2, further illustrating the positioning of a pair of pads when the lateral support device is in use.

In the embodiment illustrated in FIGS. 1-3, the laces 14a, 14b fixedly anchor to the right pad 12a. In this respect, the right pad 12a includes a pair of cavities 50 (FIG. 7) for receiving the laces 14a, 14b. The left pad 12b includes a pair of passageways 32 (FIG. 6) therethrough, which allows the pair of laces 14a, 14b to pass through the left pad 12b and exit towards the front thereof. A grommet 34 reinforces the area where each of the laces 14a, 14b exits the front of the left pad 12b. A pair of stoppers 36 circumscribes the maximum distance that the left pad 12b may move away from the right pad 12a, and prevents the left pad 12b from disengaging the laces 14a, 14b. The pair of stoppers 36 are preferably push-button actuated cord locks, but may be any suitable device known in the art for circumscribing the maximum distance that the pads 12a, 12b may move apart, such as knots, claps, snaps, buttons, etc. The laces 14a, 14b may be fixedly anchored to the left pad 12b or extend through the right pad 12a (i.e., the right pad 12a includes the pair of passageways 32). Furthermore, the laces 14a, 14b may extend through the right and left pads 12a, 12b (i.e., the laces 14a, 14b are not fixedly anchored to either of the pads 12a, 12b).

Figure 8:
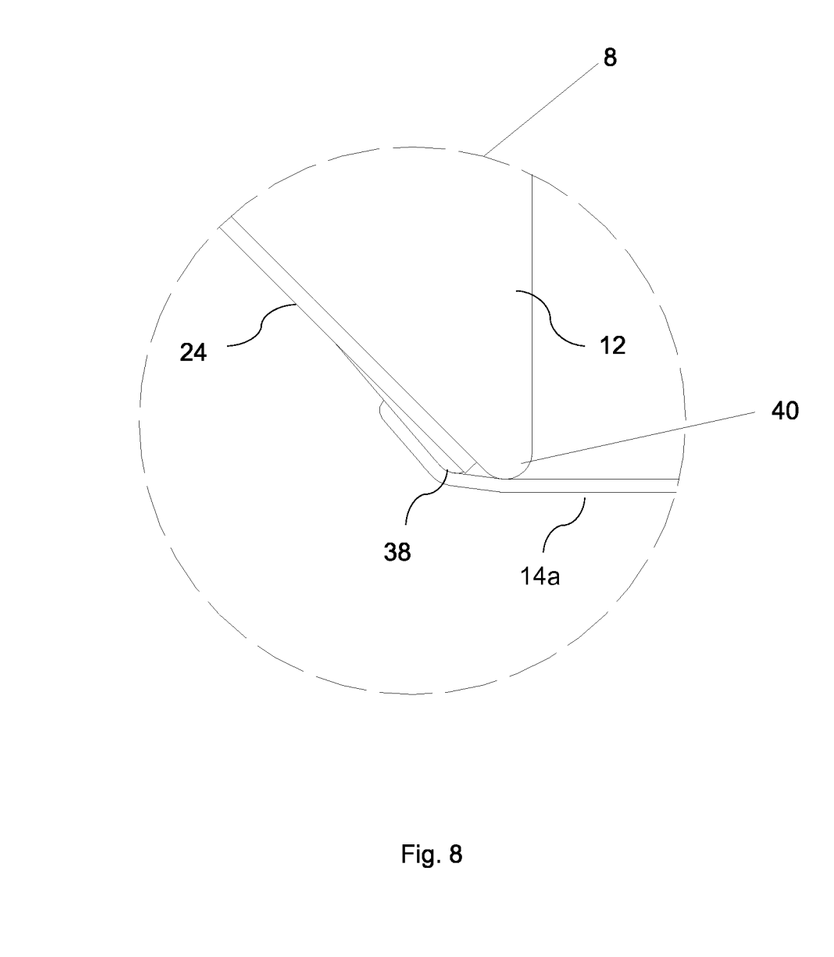
FIG. 8 is an enlarged top plan view of one of the pads taken generally about Circle 8 in FIG. 3, further illustrating a reinforcing member attached thereto and a connecting member extending therethrough.

As is more clearly illustrated in FIG. 2, the friction layer 24 covers the rear surfaces of the pads 12a, 12b that contact the side bolsters 20. The cushioning layer 30 of the pads 12a, 12b contact the side of the torso 26 while in use. As illustrated in FIG. 8, each of the passageways 32 includes a reinforcing member 38 for reinforcing the area where the laces 14a, 14b enter the rear of the left pad 12b. In similar fashion, the pair of cavities 50 each includes an anchoring member 52 that anchors the laces 14a, 14b to the rear of the right pad 12a. For example, the ends of the laces 14a, 14b may be larger than the channels (not shown) in each of the anchoring members 52, thereby preventing the laces 14a, 14b from pulling out of the cavities 50. Alternately, the laces 14a, 14b may be adhesively attached to the anchoring members 52. The reinforcing members 38 and the anchoring members 52 are preferably made from a rigid material (e.g., a polymer such as polypropylene) that resists bending while being deflected. In one embodiment, the slots (not shown) in the reinforcing members 38 are angled in the direction of the lace movement to allow the laces 14a, 14b to slide through the pair of passageways 32 in an unrestricted manner. The anchoring members 52 are oriented in a direction opposed to the movement of the laces 14a, 14b (e.g., perpendicular), as the laces 14a, 14b do not move relative to the right pad 12a.

FIG. 3 is a top plan view further illustrating the wedge-shaped top profile of the pads 12a, 12b. The handles 18 protrude forward from the lower end of the pads 12a, 12b. In one embodiment, the handles 18 curve inwardly. The friction layer 24 contacts the seat 22 along the vertical surface of the side bolster 20. The anchoring members 52 and the reinforcing members 38 are disposed on the diagonal face of the pads 12a, 12b located near an acute angled edge 40 thereon. The cushioning layer 30 of the pads 12a, 12b presses against the side of the torso 26 while in use. The laces 14a, 14b are sandwiched between the seat 22 and the torso 26. Portions of the laces 14a, 14b extend forward and away from the left pad 12b, as illustrated in FIGS. 1 and 3. The grommet 34 reinforces each of the passageway openings on the front of the left pad 12b from the force of the stoppers 36 pressing thereon while the laces 14a, 14b are pulled under loading.

Figure 4:
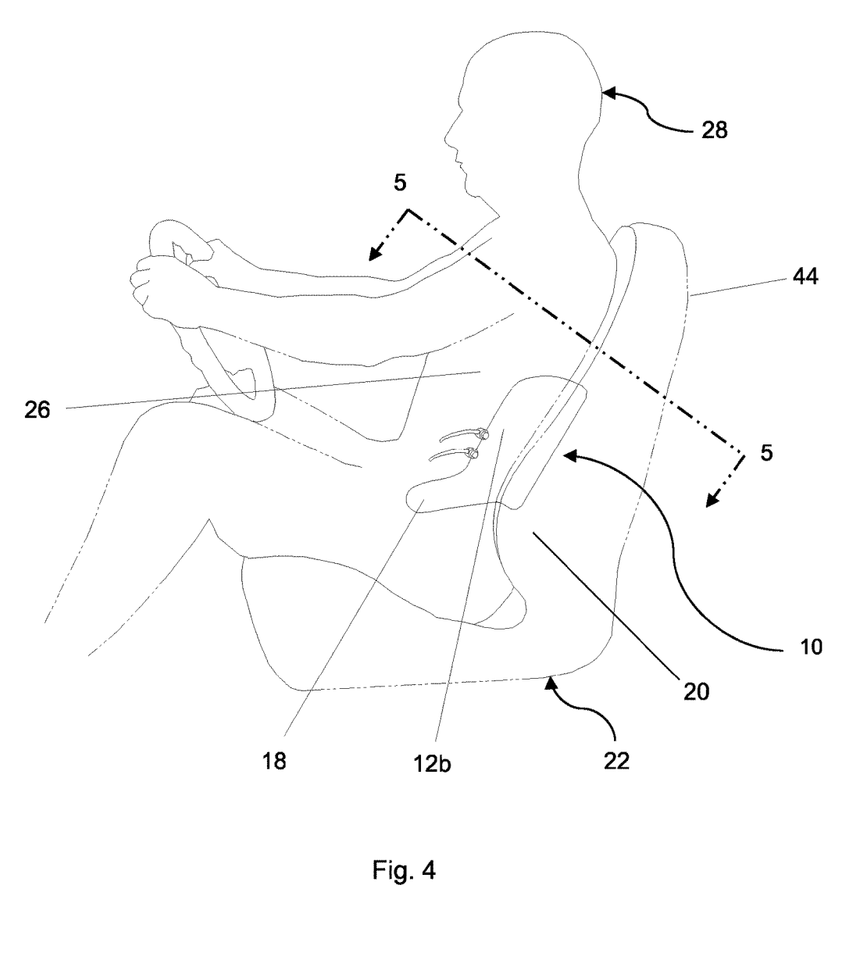
FIG. 4 is an environmental view illustrating the lateral back support installed on a seat with a user.

FIG. 4 is a side perspective elevation view further illustrating the lateral back support 10 positioned on the seat 22 with the user 28 in its working position, wedged in between the side bolsters 20 and the torso 26.

Figure 5:
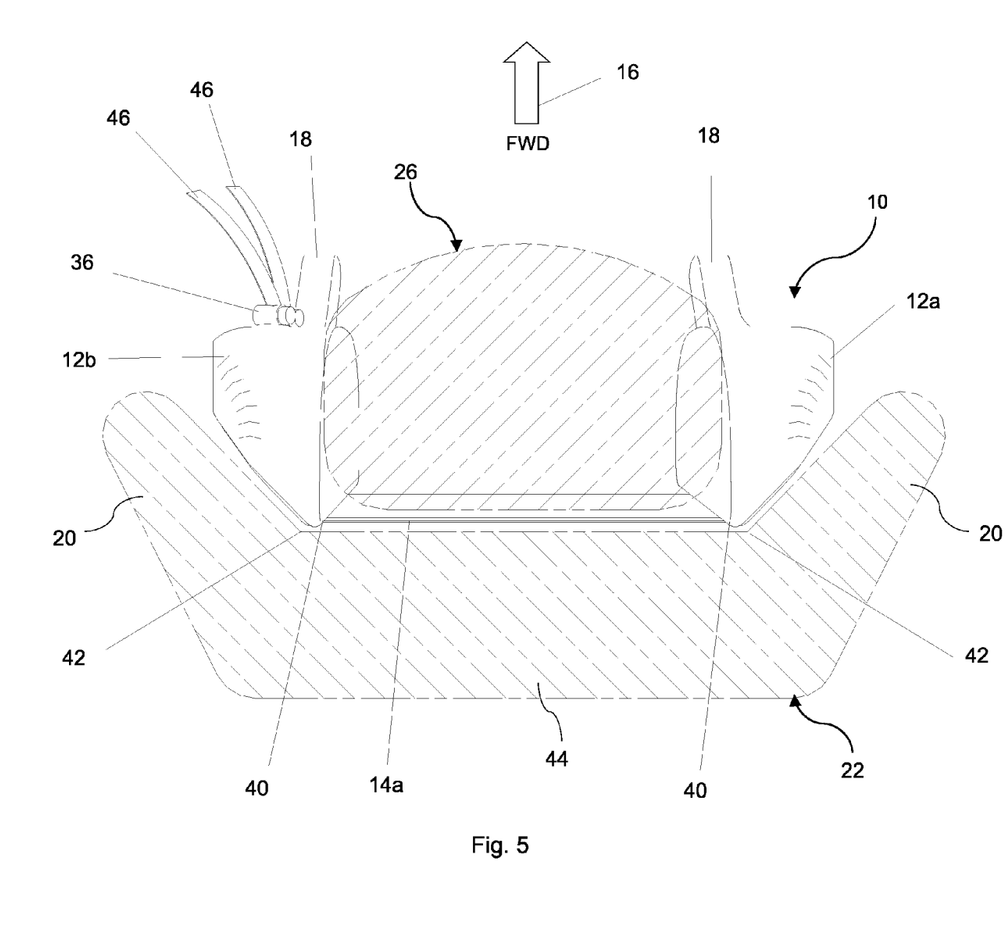
FIG. 5 is a cross-sectional view generally taken along the Line 5-5 in FIG. 4, illustrating the positioning of the pair of pads around a torso.

FIG. 5 is a cross-sectional view taken along the line 5-5 in FIG. 4, further illustrating the relative positions of the torso 26 of the user 28 while seated in the seat 22 with the lateral back support 10 positioned between the side bolsters 20 and the user 28. The laces 14a, 14b are sandwiched between the user 28 and the seat 22.

Figure 6:
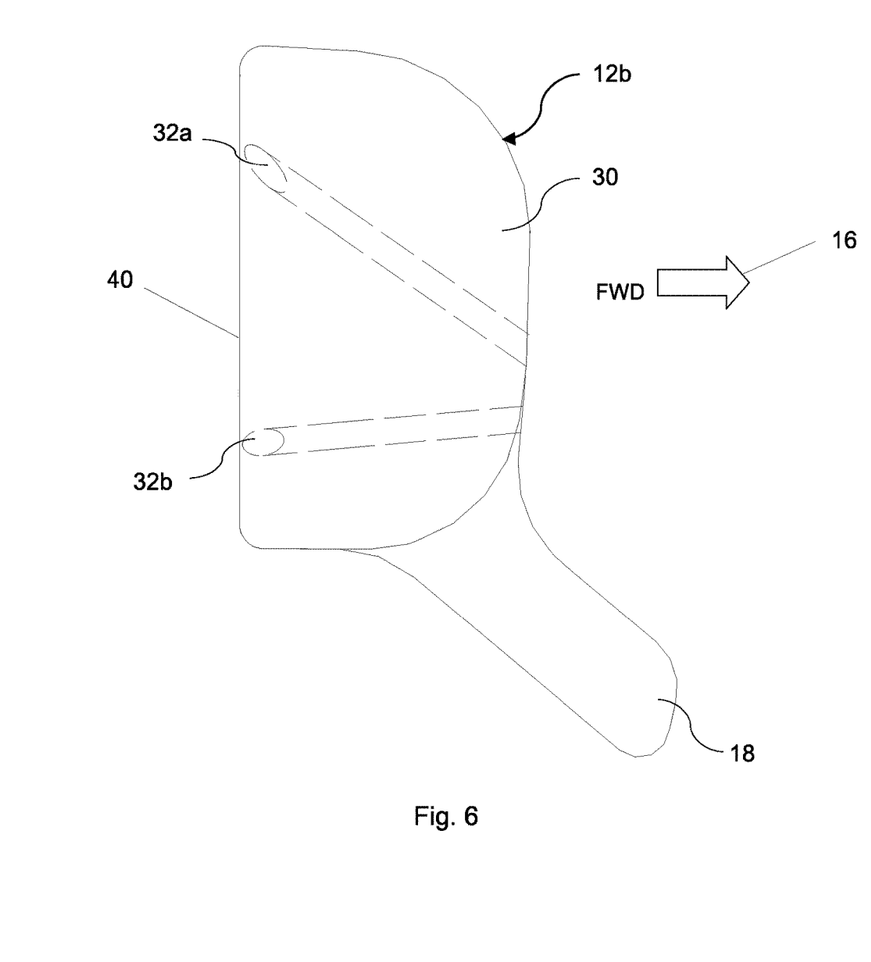
FIG. 6 is a diagrammatic view of one pad having a pair of passageways extending therethrough.
Figure 7:
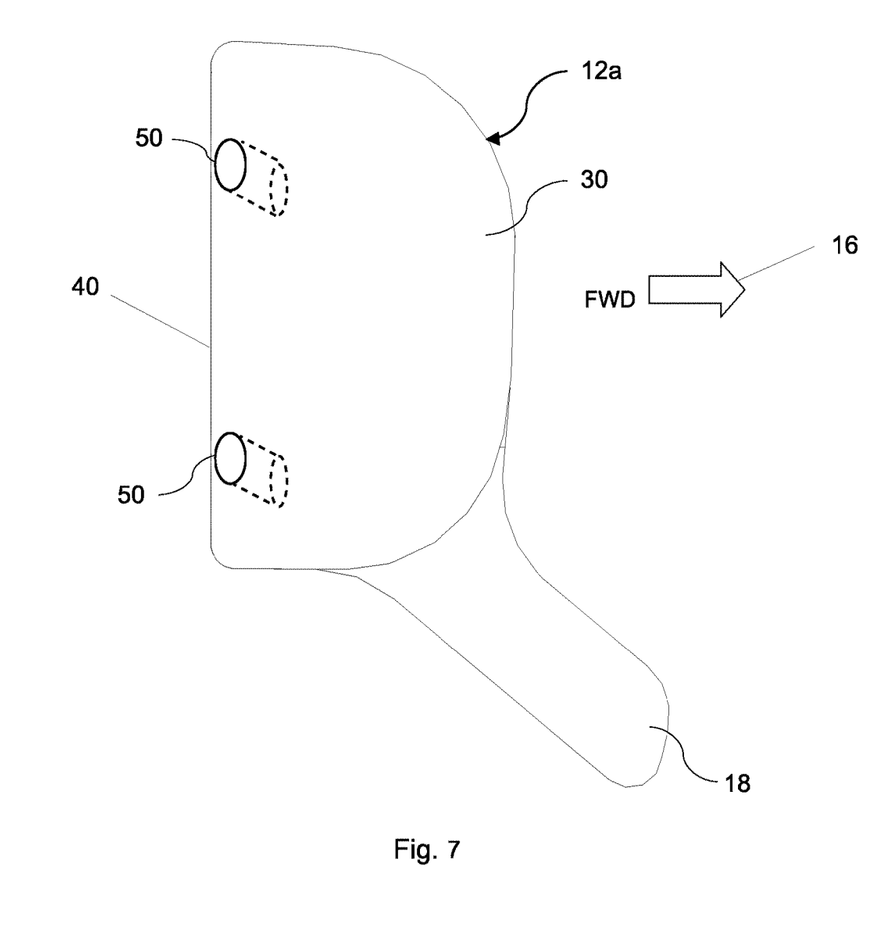
FIG. 7 is a diagrammatic view of another pad having a pair of cavities therein.

FIG. 6 illustrates an embodiment of the lateral back support 10 having an upper passageway 32a at a moderately downward angle (e.g., 45°) and a lower passageway 32b angled slightly upward (e.g., 10°) extending through the left pad 12b for accommodating the laces 14a, 14b. The diagonally protruding handles 18 are located at the lower forward corner of the pads 12a, 12b and the cushioning layer 30 is in contact with the torso 26.

To utilize the lateral back support 10, it must be adjusted to the width of the torso 26 of the user 28 and the specific seat 22, as shown in FIG. 4. First, the user adjusts the laces 14a, 14b by moving the stoppers 36 to set the desired maximum distance between the two pads 12a, 12b. The acute-angled edge 40 of the pads 12a, 12b are placed against the seat 22 and aligned with a vertical seam 42 that divides a seat back 44 and the side bolsters 20. The pads 12a, 12b are positioned and then a pair of lace tails 46 (i.e., the portions of the laces 14a, 14b extending out from the front of the left pad 12b) are pulled tight to remove any slack in the laces 14a, 14b. The stoppers 36 are positioned against the grommet 34 to control the distance between the pads 12a, 12b.

The lateral back support 10 is removed from the seat 22 as the user 28 sits down. The pads 12a, 12b are placed together so that the cushioning layers 30 touch each other with the handles 18 pointing up and forward (i.e., away from the seat back 44). The handles 18 are held with one hand as the user 28 leans forward and passes the opposite handle 18 to the opposite hand. For example, both of the handles 18 are held with the left hand and then, while leaning forward, the user 28 passes the handle 18 on the right pad 12a to the right hand behind the back and then pulls the right pad 12a against the right seat bolster, making the laces 14a, 14b taught. While holding the handles 18, the user 28 leans back into the seat 22 and against the cushioning layers 30 and the laces 14a, 14b simultaneously. Both pads 12a, 12b are pushed against the side bolsters 20 as the user 28 adjusts the height with the handles 18.

Preferably, the user 28 starts out with the distance between the pads 12a, 12b being too narrow and then slowly adjusts it until a suitable compressive force is felt. When the lateral back support 10 is installed on the seat 22, it is much easier to release tension from the laces 14a, 14b than it is to add tension. The weight of the torso 26 pushes against the pads 12a, 12b and adds tension to the laces 14a, 14b. In one embodiment, the tension is released by pressing hard against the back of the seat 22 and the laces 14a, 14b while momentarily pressing the a button 48 on each of the plurality of stoppers 36, one at a time. This allows a small amount of each of the laces 14a, 14b to pass through each of the plurality of stoppers 36, thereby increasing the distance between the pads 12a, 12b. This is felt as a lessening of the compressive force. Then, the handles 18 adjust the vertical position of the pads 12a, 12b as the tension is released to locate the most effective position.

In order to increase the compressive force of the pads 12a, 12b, the user 28 moves the torso 26 away from the lateral back support 10 by leaning forward and then pulling one lace tail 46, bringing the two pads 12a, 12b closer together. Once a suitable distance is set, the stopper 36 is released and slides down the lace tail 46 until it contacts the grommet 34. This procedure is again performed on all other lace tails 46 until the desired fit is achieved.

The tension created by the laces 14a, 14b controls the compressive force of the pads 12a, 12b. The user typically determines the optimum tension in the laces 14a, 14b by experimentation based on personal preference. If there is too much tension in the laces 14a, 14b, the pads 12a, 12b can feel too tight, causing an uncomfortable amount of lateral force against the torso. If too much tension is released, the pads 12a, 12b can feel loose and unsupportive.

The pads 12a, 12b are held in position by the force exerted thereon by the torso 26 pressing against the cushioning layers 30 and the laces 14a, 14b. The friction layer 24, which covers the area in contact with the side bolsters 20, prevents the pads 12a, 12b from sliding while subjected to lateral forces. This friction layer 24 is composed of a material with a high coefficient of static friction such as texturized rubber.

One advantage of having the laces 14a, 14b at differing heights along the vertical axis of the lateral back support 10 and being independently adjustable is that the two pads 12a, 12b can be adjusted or configured at differing angles (i.e., the tops of the pads 12a, 12b may closer together or farther apart than the bottoms thereof) to suit the specific torso profile of the user 28. That is, the stoppers 36 define the maximum distance that the pads 12a, 12b may move apart along each of the laces 14a, 14b. As mentioned above, the use of laces 14a, 14b having different lengths can further facilitate adjusting the pads 12a, 12b to different angular orientations. For example, for one user, the distance the lower lace 14b sets between the pads 12a, 12b may be shorter than the distance of the upper lace 14a, to accommodate a relatively narrower waistline. Conversely, another user with a wider ribcage may find it more comfortable to increase the maximum distance of the upper lace 14a between the pads 12a, 12b relative to the lower lace 14b.

The profile of the side bolsters 20 is a factor in adjusting the length of the laces 14a, 14b. For example, a standard bucket seat may have a relatively straight vertical profile in regard to its side bolstering, whereas the side bolstering on a sportier bucket seat may narrow towards the upper portion thereof. By controlling the vertical orientation and spacing of the pads 12a, 12b, the lateral back support 10 can be applied to many different styles of seats. Indeed, it performs well on bench seats, providing a strong amount of support.

The lateral back support 10 overcomes the problems associated with the prior art, specifically making the contact surface angle more effective to resist lateral forces, more perpendicular, and in the ability to make fine adjustments to the position of the pads 12a, 12b while seated.

The conventional side supports have the distinct disadvantage of being fixed to the seat back or an additional member. This makes fine-tuning of the pad placement awkward, as the user 28 must exit the seat 22 before making an adjustment. The new position is estimated, the pads are attached, and then the user 28 must mount the seat 22 to determine if the new positions are correct. Typically, there would be many cycles of this procedure in order to find a satisfactory fit. This repetitive method is excessively time consuming and imprecise.

Whereas on the lateral back support 10 disclosed herein, the pads 12a, 12b are held to the seat back 44 by friction and are easily fine-tuned while seated. Moreover, the adjustments can be felt as they are made, which makes the process quick and accurate. In addition, while driving, the pads 12a, 12b can be adjusted to the various road conditions. For example, when switching from highways to mountain roads, the pads 12a, 12b can be raised higher to provide more torso support while cornering.

The sides of the pads in conventional back support devices are in contact with the torso at an angle not suitable to resisting lateral forces. Most of the examples in the prior art mentioned above endeavor to convert a flat bench seat back into a bucket seat by adding side bolsters where there were none. This may improve the performance of the bench seat to a bucket seat, but fails to improve the performance of a bucket seat to a racing seat as does the lateral back support 10 disclosed herein.

The face of the side bolster on a bucket seat is typically at a 45 degree angle. The profile for the pads 12a, 12b is similar to a wedge with a 45 degree angled edge. The angle may be larger or smaller as necessary or desired. When the pads 12a, 12b are applied to the bucket seat's side bolster 20, it increases the angle of the contact surface so that it is approximately perpendicular in relation to the direction of the lateral forces. This perpendicular surface is highly effective in resisting the forces and keeps the torso 26 upright. This eliminates the distracting lateral pivoting while cornering.

The lateral back support 10 utilizes the weight of the torso 26 pressing the pads 12a, 12b, which pushes the friction layer 24 against the seat 22, thereby effectively preventing the pads 12a, 12b from slipping. Additionally, as the torso 26 presses against the laces 14a, 14b, the pads 12a, 12b pull backwards and closer together, this is felt as a gentle squeeze or hug. Even under the most extreme cornering maneuvers, the pads 12a, 12b stay gripped on the side bolsters 20 without sliding.

While driving, the torso 26 is wedged in place and immobilized. This allows the driver to concentrate clearly on the task of driving and not be distracted by having to resist the lateral forces pushing the torso 26 sideways while cornering.

The lateral back support 10 keeps the torso 26 in constant contact with the pads 12a, 12b and the seat 22, so there is no lag time between steering inputs and when the effects of the inputs are felt. Typically, a gap exists between the torso 26 and the side bolsters 20. As the vehicle turns due to a steering input, the torso 26 shifts and slides a small distance before coming in contact with the side bolster 20. The movement takes a fraction of a second, but it is perceived as a delay from the steering input. With the lateral back support 10 in use, every input is felt instantly. The steering feels crisper, more responsive.

Furthermore, the lateral back support 10 allows the driver to feel the lateral forces very clearly with the torso 26. The pads 12a, 12b create a new area of contact between the car and driver in a very sensitive part of the body. The lateral back support 10 conveys the magnitude of the lateral forces acting on the vehicle as the torso 26 is pressed into the pads 12a, 12b. This sensation is felt as feedback, which in extremely useful in car control, especially during high speed cornering.

The lateral back support 10 provides an effective and firm support against lateral forces that is lightweight, reliable, convenient and can be used by persons of almost any age and size with practically all vehicle seats. The cushioning layers 30 of the pads 12a, 12b are nearly perpendicular to the direction of the lateral forces and thus effectively stop the torso 26 from pivoting while cornering.

The easily accessible handles 18 and lace tails 46 allow the pads 12a, 12b to be adjusted while seated so as to quickly fine-tune the fit and compressive force level. In one embodiment, the pads 12a, 12b are held in place by friction. As such, the lateral back support 10 is easily installed, adjusted, and removed without the need for attachment straps or other fastening methods.

The lateral back support 10 also creates of a new, large area of feedback that allows the driver to clearly feel the subtle and gross lateral forces acting on the vehicle while cornering which are crucial for car control. By being in firm, constant contact with the seat 22, the steering feels crisp with no lag time between input and response.

With the addition of these new large areas of feedback and sensation, the task of driving is more enjoyable. As there is much more stimulus, the driver is more alert and less prone to distractions borne from boredom. The added sensory inputs can actually improve the vehicle handling skills of the driver, as there is much more information available to judge the cornering forces. In addition, the vehicle feels sportier, more responsive and pleasurable.

The usefulness of the present embodiment is not limited to resisting lateral forces while cornering in a vehicle. For those users with lower back injuries, the constant downward force of gravity while seated can aggravate the area. The optimum solution is to reduce the amount of force passing vertically downward through the spine. The sideways pressure from the pads 12a, 12b transfers weight off of the spine to the sides of the torso 26 in contact with the pads 12a, 12b, thereby reducing the downward forces acting on the lower back. For extended periods of seating, typical of airplane traveling, the pads can be utilized to relieve the pressure on the seat by a similar means.

The lateral back support 10 may lessen the physical damage to the user's body in an accident involving a collision to the side of the car. The pads would provide support to the torso and reduce the effect of the sideways whiplash.

Many other variations of the lateral back support 10 are possible. For example, other embodiments may utilize other methods to secure the pads 12a, 12b to the seat 22 including, but not limited to, elastic straps, hooks to engage the top of the seat, a mesh fabric bridging material, vertical straps, double sided tape or Velcro®. Another possible embodiment would have the wedged-shaped pads 12a, 12b sewn into a garment, such as a vest. Alternately, the pads 12a, 12b could be worn on the torso with an arrangement of straps similar to suspenders. Moreover, a wide belt could be utilized across the front of the torso to keep the pads 12a, 12b mounted to the torso and not the seat.

Although several embodiments have been described in detail for purposes of illustration, various modifications may be made without departing from the scope and spirit of the invention. Accordingly, the invention is not to be limited, except as by the appended claims.

What is claimed is:

1. A lateral back support, comprising:
a first wedge-shaped pad and a second wedge-shaped pad;
a pair of passageways disposed in the second wedge-shaped pad having a size and shape for slide-through reception of one of a pair of independently adjustable connecting members for exit out a front of the second wedge-shaped pad, each of the pair of connecting members extending between and coupling the first wedge-shaped pad to the second wedge-shaped pad and being generally spaced apart from one another along the height of each of the first and second wedge-shaped pads; and
a stopper coupled to each of the pair of connecting members and independently operable with the front of the second wedge-shaped pad to define the maximum length of the respective connecting member between the first and second wedge-shaped pads, the adjusted length of each of the pair of connecting members between the first and second wedge-shaped pads defining the angular orientation of the first wedge-shaped pad relative to the second wedge-shaped pad.

2. The lateral back support of claim 1, wherein the first and second wedge-shaped pads comprise a complementary shape.

3. The lateral back support of claim 1, wherein each of the first and second wedge-shaped pads include a handle.

4. The lateral back support of claim 3, wherein each of the handles extend outwardly diagonally downwardly and away from each other.

5. The lateral back support of claim 1, further including a friction layer along a back surface of each of the first and the second wedge-shaped pads.

6. The lateral back support of claim 1, wherein each of the first and the second wedge-shaped pads includes a forwardly-facing cushioning layer.

7. The lateral back support of claim 1, wherein the pair of connecting members comprise a flexible material.

8. The lateral back support of claim 1, wherein the first wedge-shaped pad includes a pair of cavities, each cavity having a size and shape for selected reception of the connecting member and an anchoring member.

9. The lateral back support of claim 1, wherein the relative positioning of the stopper along the length of the connecting member determines the maximum length of the respective connecting member between the first and second wedge-shaped pads.

10. The lateral back support of claim 1, wherein the stoppers comprise a push-button actuated cord lock.

11. A lateral back support, comprising:
a first wedge-shaped pad having a complementary shape to a second wedge-shaped pad;
a pair of independently adjustable connecting members extending between and coupling the first wedge-shaped pad to the second wedge-shaped pad, the pair of connecting members being generally spaced apart from one another along the height of each of the first and second wedge-shaped pads;
a pair of cavities disposed in the first wedge-shaped pad having a size and shape for selected reception of one of the pair of connecting members and an anchoring member;
a pair of passageways disposed in the second wedge-shaped pad having a size and shape for slide-through reception of one of the pair of connecting members for exit out a front of the second wedge-shaped pad; and
a stopper coupled to each of the pair of connecting members and independently operable with the front of the second wedge-shaped pad to define the maximum length of the respective connecting member between the first and second wedge-shaped pads, the adjusted length of each of the pair of connecting members between the first and second wedge-shaped pads defining the angular orientation of the first wedge-shaped pad relative to the second wedge-shaped pad.

12. The lateral back support of claim 11, wherein each of the first and the second wedge-shaped pads includes a handle, each handle extending outwardly diagonally downwardly and away from the other.

13. The lateral back support of claim 11, wherein each of the first and the second wedge-shaped pads include a forwardly-facing cushioning layer and a friction layer along a back surface thereof, and the pair of connecting members comprise a flexible material.

14. The lateral back support of claim 11, wherein the stoppers comprise a push-button actuated cord lock and couple to respective connecting members on one side of the respective passageway, the relative positioning of the stopper along the length of the connecting member determines the maximum length of the respective connecting member between the first and second wedge-shaped pads.

15. A lateral back support, comprising:
a first wedge-shaped pad and a second wedge-shaped pad;
a handle extending from each of the first and the second wedge-shaped pads;
a friction layer along a back surface of each of the first and the second wedge-shaped pads;
a forwardly-facing cushioning layer disposed on the first and the second wedge-shaped pads;
a pair of passageways disposed in the second wedge-shaped member having a size and shape for slide-through reception of one of a pair of independently adjustable and flexible connecting members for exit out a front of the second wedge-shaped pad, each of the pair of connecting members extending between and coupling the first wedge-shaped pad to the second wedge-shaped pad and being generally spaced apart from one another along the height of each of the first and the second wedge-shaped pads; and
a push-button actuated cord lock coupled to each of the pair of connecting members and independently operable with the front of the second wedge-shaped pad to define the maximum length of the respective connecting member between the first and second wedge-shaped pads, the adjusted length of each of the pair of connecting members between the first and second wedge-shaped pads defining the angular orientation of the first wedge-shaped pad relative to the wedge-shaped second pad.

16. The lateral back support of claim 15, wherein the first and the second wedge-shaped pads comprise a complementary wedge-shape.

17. The lateral back support of claim 15, wherein each of the handles extends outwardly diagonally downwardly and away from each other.

18. The lateral back support of claim 17, wherein the first wedge-shaped pad includes a pair of cavities, each cavity having a size and shape for selected reception of the connecting member and an anchoring member, and wherein the stoppers couple to respective connecting members on one side of the respective passageway, the relative positioning of the stopper along the length of the connecting member determines the maximum length of the respective connecting member between the first and second wedge-shaped pads.

* * * * *